(12) United States Patent
Eguchi

(10) Patent No.: US 12,143,725 B2
(45) Date of Patent: Nov. 12, 2024

(54) RANGE MEASUREMENT APPARATUS, STORAGE MEDIUM AND RANGE MEASUREMENT METHOD

(71) Applicant: CANON KABUSHIKI KAISHA, Tokyo (JP)

(72) Inventor: Yosuke Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 17/570,551

(22) Filed: Jan. 7, 2022

(65) Prior Publication Data

US 2022/0232166 A1 Jul. 21, 2022

(30) Foreign Application Priority Data

Jan. 21, 2021 (JP) ................................ 2021-007796

(51) Int. Cl.
*H04N 23/68* (2023.01)
*G01C 3/08* (2006.01)
*G01C 3/32* (2006.01)
*G03B 5/04* (2021.01)
*G03B 5/06* (2021.01)
*H04N 23/67* (2023.01)

(52) U.S. Cl.
CPC .......... *H04N 23/687* (2023.01); *G01C 3/085* (2013.01); *G01C 3/32* (2013.01); *G03B 5/04* (2013.01); *G03B 5/06* (2013.01); *H04N 23/67* (2023.01); *H04N 23/681* (2023.01); *G03B 2205/0015* (2013.01); *G03B 2205/0023* (2013.01)

(58) Field of Classification Search
CPC .... H04N 23/687; H04N 23/67; H04N 23/681; G01C 3/085; G01C 3/32; G03B 5/04; G03B 5/06; G03B 2205/0015; G03B 2205/0023; G03B 2205/0007; G03B 5/00; G03B 13/20
See application file for complete search history.

(56) References Cited

U.S. PATENT DOCUMENTS 8,810,665 B2    8/2014  Uehara
9,264,606 B2    2/2016  Ishihara
(Continued)

FOREIGN PATENT DOCUMENTS

JP    2006-330771 A    12/2006
JP    2012-231262 A    11/2012
(Continued)

OTHER PUBLICATIONS

Sep. 3, 2024 Japanese Official Action in Japanese Patent Appln. No. 2021-007796.

*Primary Examiner* — Luong T Nguyen
(74) *Attorney, Agent, or Firm* — Venable LLP

(57) ABSTRACT

In order to provide a range measurement apparatus which enables an accurate distance measurement while an anti-vibration mechanism is operated, the range measurement apparatus includes an image information acquisition unit configured to acquire an image captured by an image pickup optical system having an anti-vibration optical system, a distance information acquisition unit configured to acquire distance information regarding a distance to a subject based on the image, and a distance correction unit configured to correct the distance information based on aberration information according to a driving amount of the anti-vibration optical system.

17 Claims, 10 Drawing Sheets

(56) References Cited

U.S. PATENT DOCUMENTS

| | | |
|---|---|---|
| 9,781,344 B2 | 10/2017 | Ishihara |
| 2007/0003262 A1* | 1/2007 | Shiratori .............. H04N 23/663 |
| | | 348/E5.046 |
| 2012/0044369 A1* | 2/2012 | Irisawa .............. H04N 23/6812 |
| | | 359/554 |
| 2012/0257882 A1* | 10/2012 | Kikuchi ............... H04N 23/663 |
| | | 396/91 |
| 2013/0044226 A1 | 2/2013 | Uehara |
| 2015/0092091 A1 | 4/2015 | Ishihara |
| 2016/0127648 A1 | 5/2016 | Ishihara |
| 2016/0219211 A1* | 7/2016 | Katayama ............ H04N 5/2226 |
| 2018/0284389 A1* | 10/2018 | Fukuda .................. H04N 25/61 |
| 2018/0367772 A1* | 12/2018 | Nobayashi ............... G02B 7/34 |
| 2019/0120950 A1* | 4/2019 | Tanaka .................... G06T 7/593 |

FOREIGN PATENT DOCUMENTS

| | | |
|---|---|---|
| JP | 2013-041117 A | 2/2013 |
| JP | 2015-072155 A | 4/2015 |
| JP | 2016-059051 A | 4/2016 |
| JP | 2017-194591 A | 10/2017 |
| JP | 6628678 B2 | 1/2020 |

\* cited by examiner

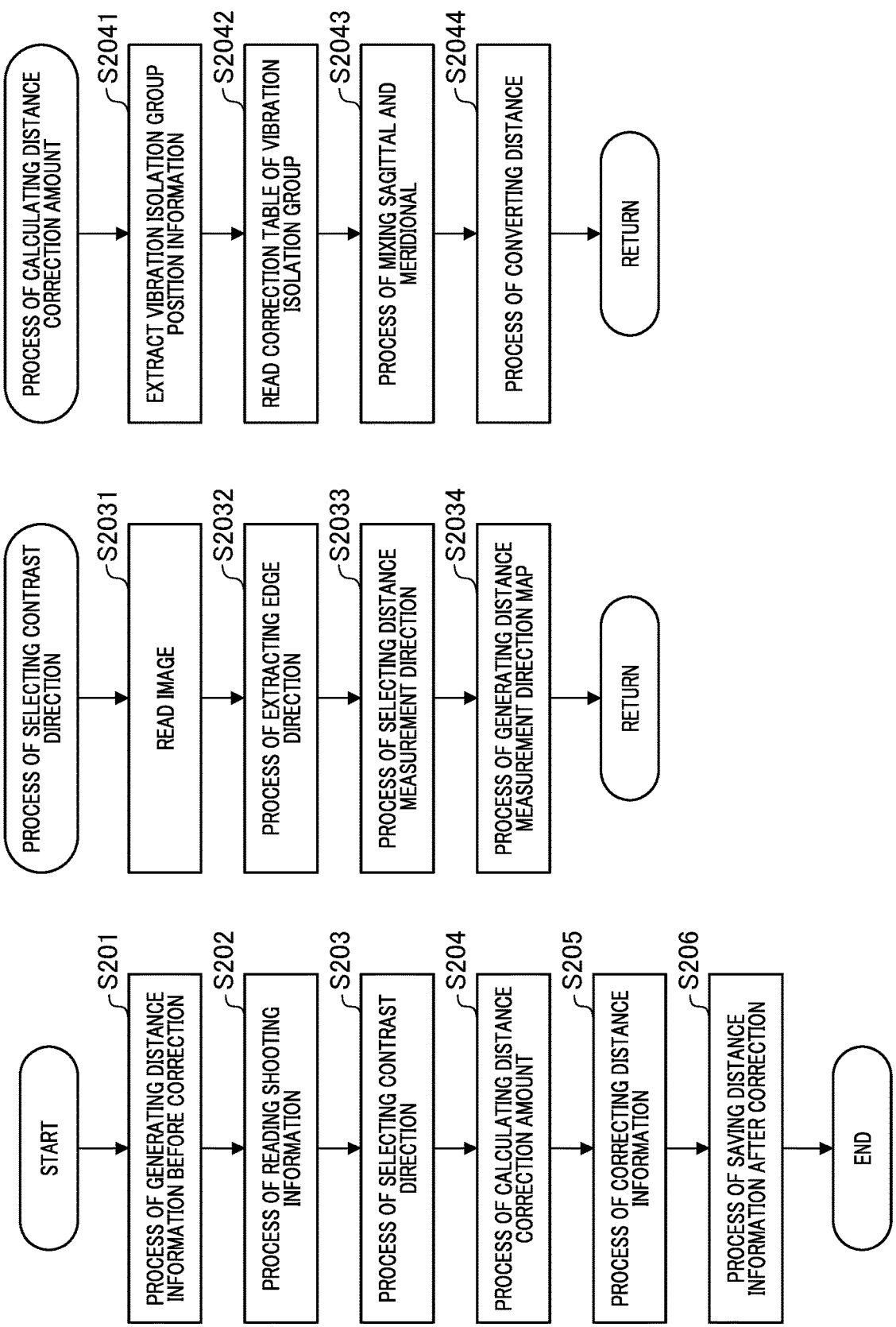

RANGE MEASUREMENT APPARATUS, STORAGE MEDIUM AND RANGE MEASUREMENT METHOD

BACKGROUND OF THE INVENTION

Field of the Invention

The present invention relates to a range measurement apparatus having an anti-vibration optical system, a storage medium, a range measurement method, and the like.

Description of the Related Art

Conventionally, a distance detection technology by a phase difference method is known as a range measurement apparatus applicable to a digital still camera or a digital video camera and a distance detection technology using the range measurement apparatus. In an example of this method, for example, two optical images (hereinafter referred to as an A image and a B image) formed by a luminous flux passing through two pupil regions displaced in a horizontal direction are acquired. A distance to a subject can be calculated by calculating an amount of image displacement (parallax, a phase difference) which is a relative amount of displacement between the A image and the B image and converting the amount of image displacement into an amount of defocus via a conversion factor based on a distance between the two pupil regions on a lens pupil.

In addition, in recent years, an anti-vibration function has been installed in a digital still camera and a digital video camera in order to prevent image blur caused by camera shake and the like. For example, in Japanese Patent Laid-Open No. 2012-231262, when a part of a lens system is shifted to curb the image blur, a state of distortion aberration changes due to the shift of the lens system, and thus a distortion aberration correction of a display image is carried out according to position information of an image blur correction optical system.

Further, for example, Japanese Patent No. 6628678 describes a method of measuring a phase difference distance on an image pickup surface using an image pickup system having an anti-vibration function, and it is described that distance information is corrected to reduce an error due to displacement in a plane of two images caused by drive of an anti-vibration optical system.

An image pickup apparatus (such as a digital still camera or a digital video camera) provided with a distance measurement device is preferably portable, and a distance map of an intended composition can be obtained by carrying a camera and shooting from an appropriate position. In addition, a high-density and high-precision distance map can be obtained by shooting from a close distance.

However, when image correction is performed according to an amount of light and image distortion which fluctuate due to anti-vibration by a method like that described in Japanese Patent Laid-Open No. 2012-231262, fluctuations in image brightness, distortion, and the like can be curbed, but distance information fluctuates. That is, there is a problem that an error occurs in the distance measurement.

In Japanese Patent No. 6628678, although correction of the distance information is carried out by anti-vibration, correction caused by fluctuation of curvature of an image surface due to the anti-vibration is not considered, and thus there is a problem that high-precision correction cannot be performed.

The present invention has been made in consideration of the above problems, and an object of the present invention is to provide a range measurement apparatus which enables accurate distance measurement while an anti-vibration mechanism is operated.

SUMMARY OF THE INVENTION

In order to achieve the above object, one aspect of a range measurement apparatus of the present invention includes an image information acquisition unit configured to acquire an image captured by an image pickup optical system having an anti-vibration optical system, a distance information acquisition unit configured to acquire distance information regarding a distance to a subject based on the image, and a distance correction unit configured to correct the distance information based on aberration information according to a driving amount of the anti-vibration optical system.

Further, features of the present invention will become apparent from the following description of embodiments with reference to the attached drawings.

BRIEF DESCRIPTION OF THE DRAWINGS

FIG. 9A is a flowchart for a distance measurement of a second embodiment, FIG. 9B is a flowchart showing content of a process of Step S203, and FIG. 9C is a flowchart showing content of a process of Step S204.

DESCRIPTION OF THE EMBODIMENTS

Hereinafter, with reference to the accompanying drawings, a favorable mode of the present invention will be described using embodiments. In each view, the same reference signs are applied to the same members or elements, and duplicate description will be omitted or simplified.

Further, in the embodiments, an example of application to a digital camera as an image pickup apparatus will be described. However, the image pickup apparatus includes an electronic device having an image pickup function such as a digital video camera, a smart phone with a camera, a tablet computer with a camera, an in-vehicle camera, or a network camera.

First Embodiment

Figure 1:
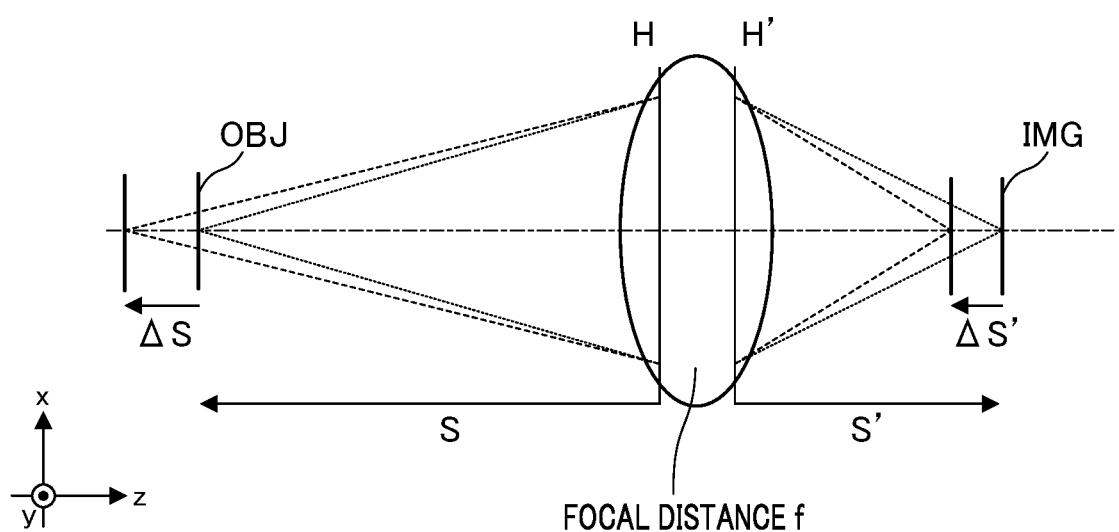
FIG. 1 is a view showing an image formation relationship of a lens in a first embodiment of the present invention.

FIG. 1 is a view showing an image formation relationship of a lens in a first embodiment of the present invention.

In the embodiment, a direction parallel to an optical axis is defined as a z direction or a defocus direction, a direction orthogonal to the optical axis and parallel to a horizontal direction of an image pickup surface is defined as an x direction, and a direction parallel to a vertical direction of the image pickup surface is defined as a y direction.

A distance measurement method such as an image pickup surface phase difference distance measurement method or a depth from defocus (DFD) method, in which a parallax amount is obtained from an image formed through an image pickup optical system and the parallax amount is converted into a defocus amount to measure a distance, is known.

In FIG. 1, OBJ is an object surface, IMG is an image surface, H is a front principal point, H' is a rear principal point, S is a distance from the object surface to the front principal point, and S' is a distance from the rear principal point to the image surface. Further, ΔS' is a defocus amount, and ΔS is a relative distance on the object side according to the defocus amount. An alternate long and short dash line is the optical axis, a dotted line is an image formation luminous flux, and a broken line is a defocused luminous flux.

It is known that the following Equation 1 is established in the image formation of a lens. f is a focal length of the lens.

$$\frac{1}{S} + \frac{1}{S'} = \frac{1}{f} \qquad \text{Equation 1}$$

Also, at the time of defocus, Equation 2, which is a modification of Equation 1, is established.

$$\frac{1}{S+\Delta f} + \frac{1}{S'+\Delta S'} = \frac{1}{f} \qquad \text{Equation 2}$$

Since S and f read from shooting information are known, S' can be obtained from Equation 1 and ΔS can be obtained from Equation 2 using ΔS' determined by the above-described image pickup surface phase difference distance measurement method or DFD method.

As described above, subject distance information can be generated using the shooting information and the defocus amount by combining Equation 1 and Equation 2. Since the defocus amount can be obtained in a part or all of the region on a screen, the subject distance information can also be obtained corresponding to the region in which the defocus amount is calculated.

<Distance Measurement Error Due to Image Surface Curvature>

FIG. 2 is a view illustrating a distance measurement error due to an image surface curvature in the first embodiment.

The distance measurement methods such as the above-described image pickup surface phase difference distance measurement method and DFD method, in which the distance measurement is performed from an image formed through an image pickup optical system, are affected by the image surface curvature of the image pickup optical system, especially in the vicinity of the periphery of the screen.

Figure 2A:
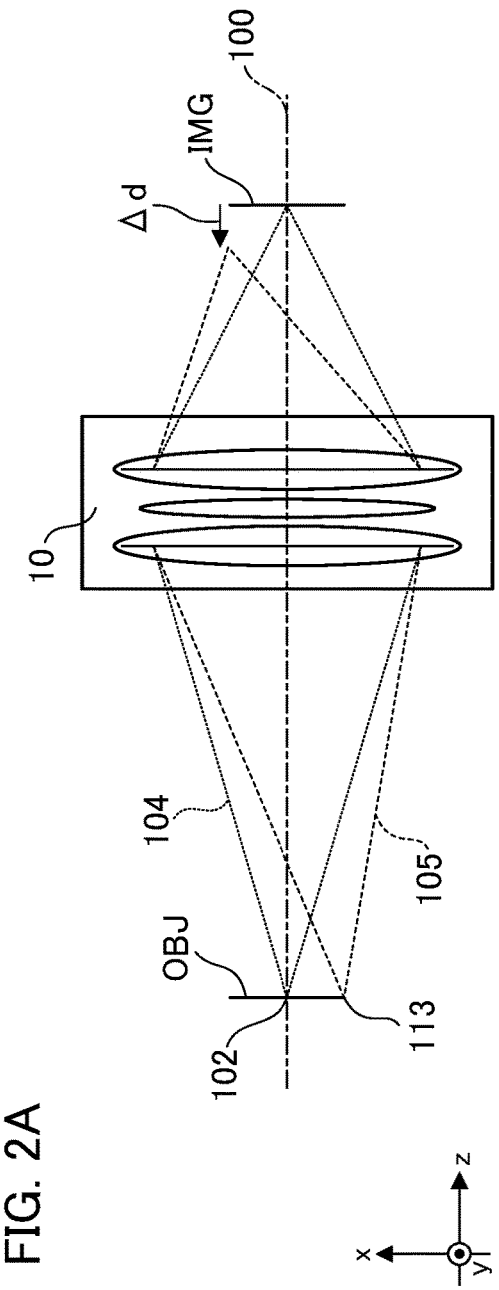
FIG. 2A is a schematic view illustrating an image surface curvature of an image pickup optical system 10 in the first embodiment.

FIG. 2A is a schematic view illustrating the image surface curvature of the image pickup optical system 10. Light emitted from an object point 102 which is present on an optical axis 100 ideally forms an image at one point on the image surface IMG by the image pickup optical system 10. Further, light emitted from an object point 113 which is present on a plane perpendicular to the optical axis 100 ideally forms an image at one point on a plane of the image surface IMG.

However, the image pickup optical system 10 generally has the image surface curvature, and a position at which the light emitted from the object point 113 forms an image is displaced in the optical axis direction, and thus defocus occurs. In FIG. 2A, 104 represents a luminous flux emitted from the object point 102, and 105 represents a luminous flux emitted from the object point 113. Δd is an amount of the image surface curvature of the image point corresponding to 105. Here, FIG. 2A shows an image surface curvature of a meridional image surface, and an image surface curvature of a sagittal image surface is omitted, but the image surface curvature of the sagittal image surface generally has a value different from that of the meridional image surface.

As described above, the amount of defocus on the image surface differs due to the aberration of the image pickup optical system, particularly, the image surface curvature of the periphery of the screen. Since the above-described distance measurement method depends on the amount of defocus, the calculated distance differs due to the image surface curvature even for subjects located at the same distance.

Normally, the image surface curvature takes a value that is almost fixed according to a state of zoom, focus, and aperture. The deviation of the defocus amount including the image surface curvature can be corrected by calculating a defocus correction map using a design value of the image pickup optical system or a factory measurement value measured at the time of shipment from a factory, and thus the distance measurement error can be eliminated.

<Distance Measurement Error During Anti-Vibration>

Figure 2B:
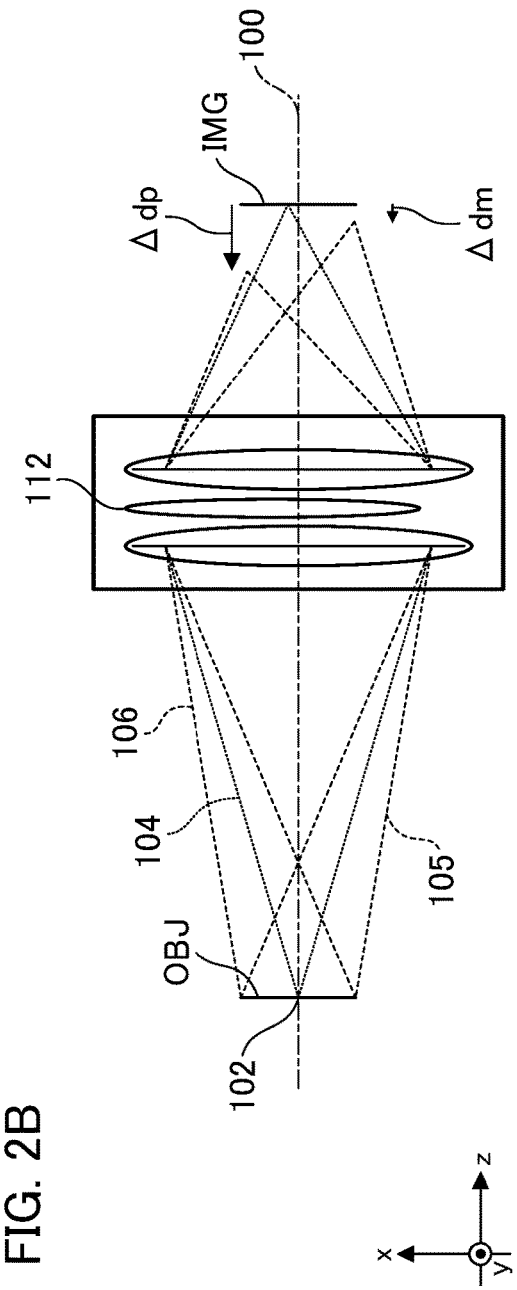
FIG. 2B is a view showing a luminous flux emitted from an object point at a symmetrical position about an optical axis.

However, at the time of anti-vibration, a difference occurs from the design value and the factory measurement value due to eccentric aberration, and when the asymmetric image surface curvature remains, the distance measurement error occurs. In FIG. 2B, each of 105 and 106 shows the luminous flux emitted from object points at symmetrical positions about the optical axis. As shown in the drawing, due to an anti-vibration group (an anti-vibration optical system) 112 being driven, for example, in a direction perpendicular to the optical axis, an image surface curvature Δdp is generated on one side of the image, and an image surface curvature Δdm is generated at a symmetrical position. It is shown that the defocus amount increases or decreases with respect to Δd in FIG. 2A before the anti-vibration group is driven.

Here, in FIG. 2, the drive of the anti-vibration group is shown by the drive in a cross section in the direction perpendicular to the optical axis, but the drive method is not limited thereto. For example, a method such as a vari-angle prism (VAP) in which the anti-vibration is performed by tilting one surface of a parallel flat plate of which the inside is filled with a liquid may be used. Further, a method in which the anti-vibration is performed by tilting the anti-vibration group may be used.

That is, as described above, the anti-vibration optical system in this embodiment may be any one which performs the anti-vibration by driving at least one optical element in a direction perpendicular to the optical axis or tilting the optical element with respect to the optical axis.

In this way, when the anti-vibration is performed by refraction in the image pickup optical system, due to the influence of eccentric aberration, the image surface curvature that is asymmetrical with respect to a center of the screen occurs, and the amount of defocus fluctuates, which causes a distance measurement error.

In a general image pickup optical system, the influence of eccentric aberration generated by the anti-vibration does not affect the image quality or is designed to have a minimum influence. However, in the case of the distance measurement method using defocus for the distance measurement, there is a possibility that a large distance measurement error may occur especially in a peripheral portion of the screen due to an image surface curvature component of the eccentric aberration generated by the anti-vibration. In particular, as a driving amount of the anti-vibration group becomes larger, a generated amount of eccentric aberration increases.

<Generation of Correction Map by Anti-Vibration Group Drive Phase>

For example, it is assumed that the defocus amount is obtained from the parallax amount using a technology such as an image pickup surface phase difference distance measurement method or a DFD method, and the distance measurement is performed. Further, in order to correct the vibration, the anti-vibration group described above is driven by an arbitrary driving amount in an arbitrary direction (phase) on a plane perpendicular to the optical axis. In that case, since a direction in which the parallax is detected is a predetermined direction which is mechanically or algorithmically restricted, the influence of the image surface curvature component on the parallax due to the movement of the anti-vibration group changes according to a phase of the anti-vibration group even when the driving amount of the anti-vibration group is the same. That is, even when the driving amount is the same, the defocus correction map due to the anti-vibration differs according to the phase of the anti-vibration group.

Therefore, in this embodiment, a plurality of defocus correction maps which do not depend on the phase (the driving direction) of the anti-vibration group are held. These are used as the correction map corresponding to a plurality of first correction amounts. Further, it is possible to generate a defocus correction map by mixing (for example, weighting and adding) a plurality of first correction amounts with an amount determined by the driving amount and the phase of the anti-vibration group. The mixed defocus correction map corresponds to a second correction amount. High-precision distance measurement can be performed by correcting the distance information using the second correction amount.

For example, the image surface curvature components of the sagittal image surface and the meridional image surface of the defocus amount generated by the anti-vibration group are line-symmetrical in a direction perpendicular to the driving direction. Therefore, it is possible to generate the defocus correction map in a parallax detecting direction without having data for each phase by providing the two defocus correction maps and mixing phases of the anti-vibration group as coefficients.

Figure 3:
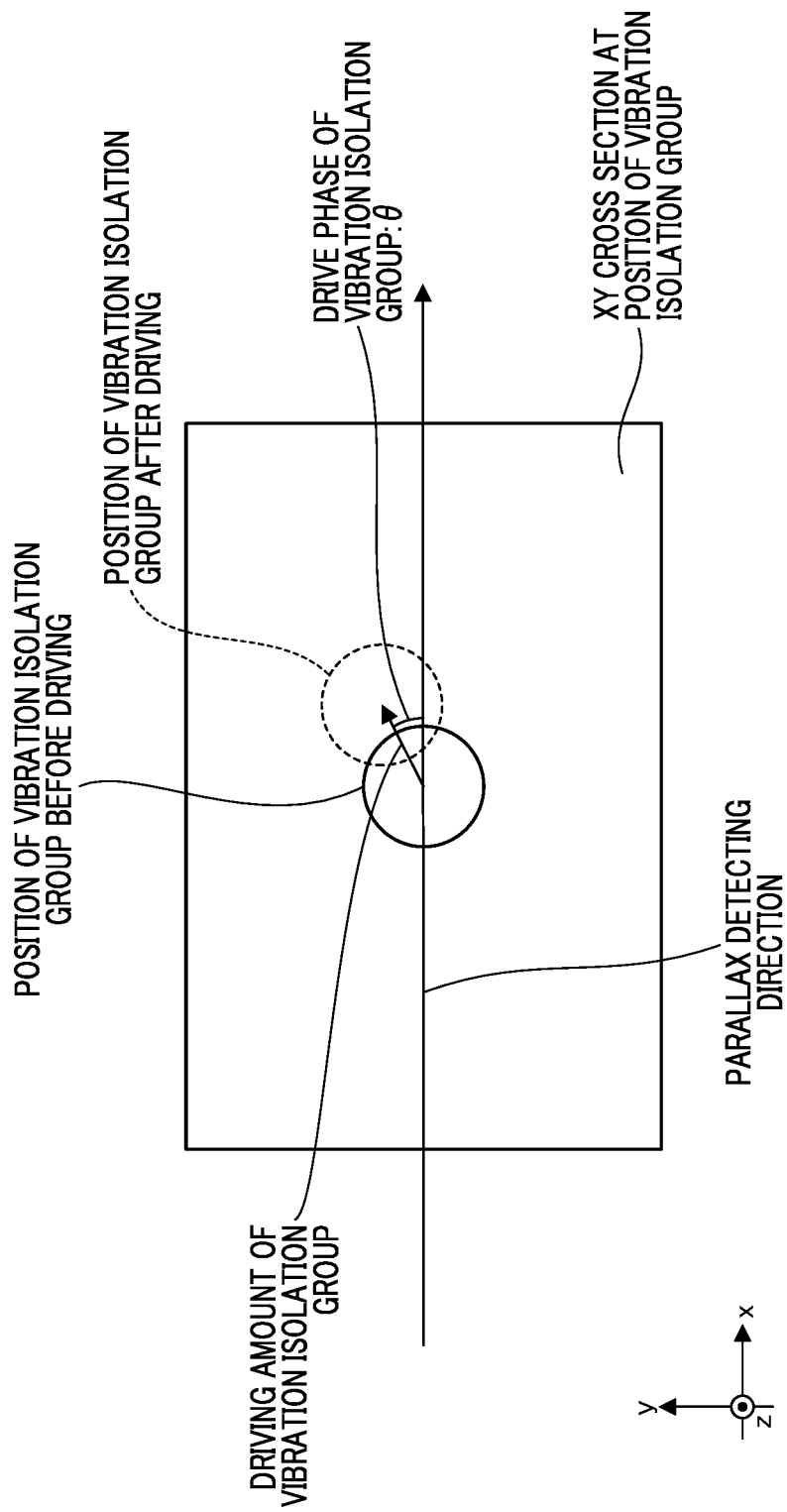
FIG. 3 is a view showing a relationship between a driving direction of an anti-vibration group and a parallax detecting direction according to the first embodiment.

FIG. 3 is a view showing a relationship between the driving direction and the parallax detecting direction of the anti-vibration group according to the first embodiment of the present invention.

When the parallax detecting direction is the horizontal direction, an angle formed by the driving direction of the anti-vibration group and the horizontal direction is defined as a drive phase θ. It is possible to generate the defocus correction map according to the parallax detecting direction by mixing the image surface curvature component of the sagittal image surface and the image surface curvature component of the meridional image surface with the drive phase θ as an argument. In FIG. 3, the drive of the anti-vibration group is illustrated by the drive in the cross section in the direction perpendicular to the optical axis, but the drive method is not limited thereto.

For example, like the above-described vari-angle prism, a method in which the anti-vibration is performed by tilting one surface of a parallel flat plate of which the inside is filled with a liquid may be used. Further, a method in which the anti-vibration is performed by tilting an optical element such as a lens of the anti-vibration group may be used. When different methods are used, for example, the correction process is performed by respectively converting the driving amount to the tilt angle and the drive phase to a tilt direction.

<Captured Image Information>

In this embodiment, captured image information as input information is, for example, information attached as metadata to an image captured by a digital camera.

Figure 4:
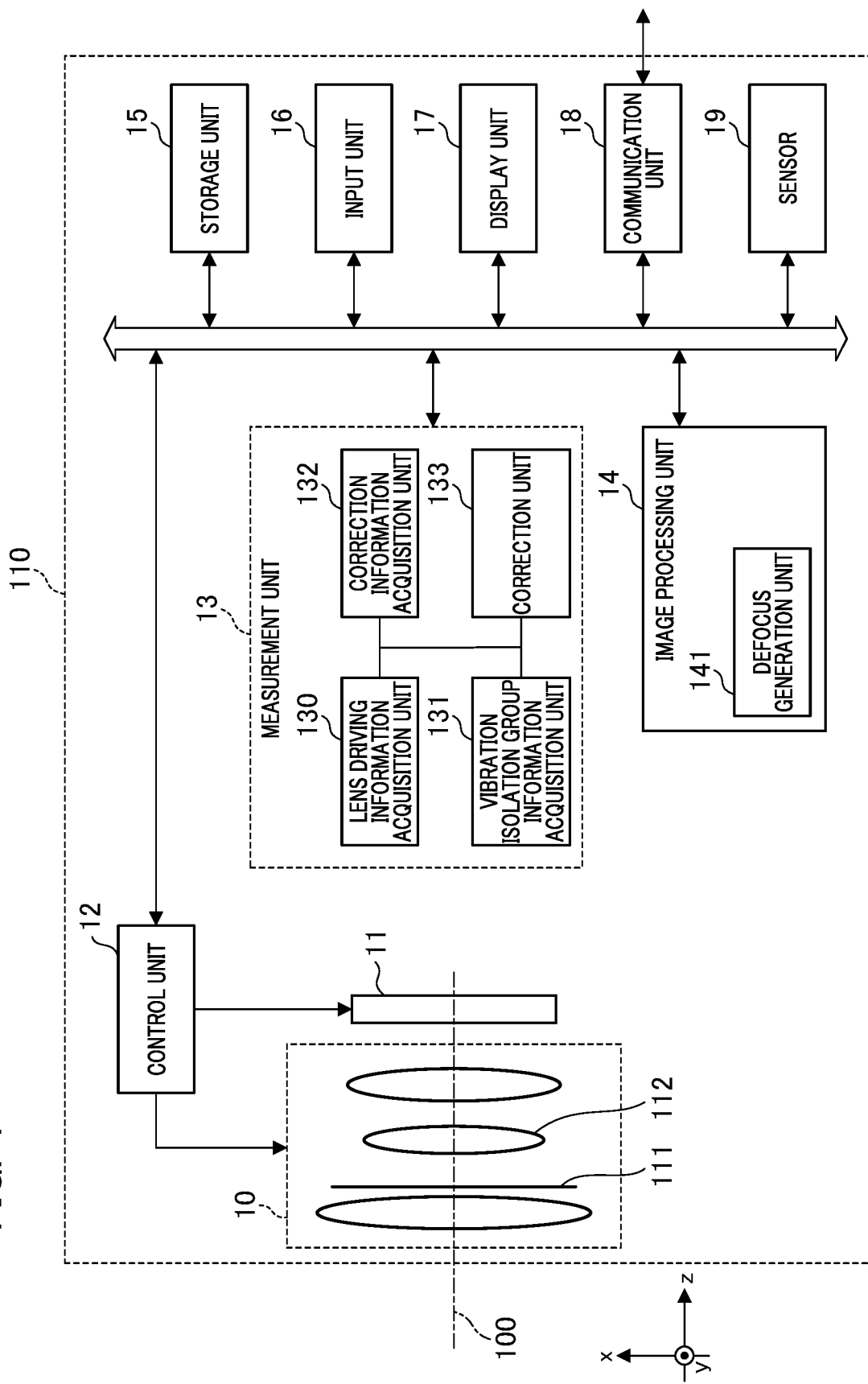
FIG. 4 is a block view showing a functional configuration of a digital camera 110 of the first embodiment.

FIG. 4 is a block view showing a functional configuration of the digital camera 110 of the first embodiment.

The image pickup optical system 10 is a photographing lens built in the digital camera 110 or of an interchangeable lens type and forms an optical image of a subject on the image pickup element 11.

The image pickup optical system 10 is composed of a plurality of lenses arranged on the optical axis 100, has an exit pupil 111 at a distant position from the image pickup element 11 by a predetermined distance, and has an anti-vibration group (an anti-vibration optical system) 112.

In this embodiment, although a digital camera as an image pickup apparatus also functions as the range measurement apparatus, the range measurement apparatus may be configured to measure a distance by reading an image from a recording medium and processing the image in an image processing device such as a PC or a tablet.

The image pickup element 11 is, for example, a charge coupled device (CCD), a complementary metal oxide semiconductor (CMOS) sensor, or the like. The image pickup element 11 photoelectrically converts a subject image formed on the image pickup surface via the image pickup optical system 10 and outputs an image signal corresponding to the subject image. The image pickup element 11 functions as an image pickup unit which captures a subject.

The control unit 12 is a control device including, for example, a central processing unit (CPU), a microprocessor, or the like as a computer and controls an operation of each block included in the digital camera 110 based on a computer program stored in a memory.

The control unit 12 controls, for example, autofocus (AF) at the time of image pickup, a change of a focus (focusing) position, a change of an F value (an aperture), a capture of an image, and each of the units inside the digital camera 110 such as a storage unit 15, an input unit 16, a display unit 17, and a communication unit 18.

A measurement unit 13 calculates a distance to the focused subject. As shown in the drawing, the measurement unit 13 includes a lens drive information acquisition unit 130, an anti-vibration group information acquisition unit 131, a correction information acquisition unit 132, and a correction unit 133.

An image processing unit 14 is a block which realizes various image processes in the digital camera 110. Various signal processes such as noise removal, demosaicing, brightness signal conversion, aberration correction, white balance adjustment, and color correction in the image signal output from the image pickup element 11 are performed. As shown in the drawing, the image processing unit 14 has a defocus generation unit 141 and generates a defocus signal from two types of obtained image signals (an A image signal and a B image signal).

Image data (captured image) output from the image processing unit 14 is stored in a memory (not shown) and displayed on the display unit 17. Further, the output image data is stored in the storage unit 15. The image processing unit 14 may be configured using a logic circuit or may be configured of a central processing unit (CPU) and a memory for storing an arithmetic processing program.

Next, the storage unit 15 is a non-volatile recording medium on which a correction table or the like based on captured image data, intermediate data generated in the process of the operation of each of the blocks, parameters referred to in the operation of the image processing unit 14 and the digital camera 110, and aberration information is recorded. The storage unit 15 may be any recording medium which can read and write at high speed and has a large capacity, and for example, a flash memory or the like is preferable.

Here, it functions as a memory which stores at least one correction table based on aberration information according to the driving amount of the anti-vibration optical system. The measurement unit 13, the image processing unit 14, the storage unit 15, and the like constitute a distance correction unit which corrects the distance information based on the aberration information according to the driving amount of the anti-vibration optical system.

The input unit 16 is a user interface which detects an operation input of an information input or a setting change performed with respect to the digital camera 110 using a dial, a button, a switch, a touch panel, or the like, for example. When the input unit 16 detects the operation input performed, the input unit 16 outputs a corresponding control signal to the control unit 12.

The display unit 17 is, for example, a display device such as a liquid crystal display, an organic EL, or the like. The display unit 17 is used for confirming a composition at the time of shooting and displaying various setting screens and message information by through-displaying the captured image. In addition, it is possible to have both a display function and an input function using a touch panel.

The communication unit 18 is a communication interface for transmitting and receiving information to/from the outside and is configured to be able to send the obtained captured image, shooting information, and the like to another device.

A sensor 19 is a type of sensor for monitoring a state of the image pickup apparatus, and for example, an acceleration sensor, a gyro sensor, a temperature sensor, and the like are mounted. The gyro sensor and the acceleration sensor are generally used for anti-vibration of image pickup apparatus, the shake of the image pickup apparatus is detected by the acceleration sensor or the like, and the shake of the image is canceled by driving the anti-vibration optical system according to the shake.

The captured image information in this embodiment is not limited to the one accompanying the captured image taken by the digital camera. For example, it may accompany an image or moving image simulated using a 3D model and ray tracing.

<Configuration Example of Image Sensor>

FIG. 5 is a view for describing the image pickup element 11 of the digital camera 110 of the first embodiment, and a detailed configuration example of the image pickup element 11 will be described with reference to FIG. 5.

Figure 5A:
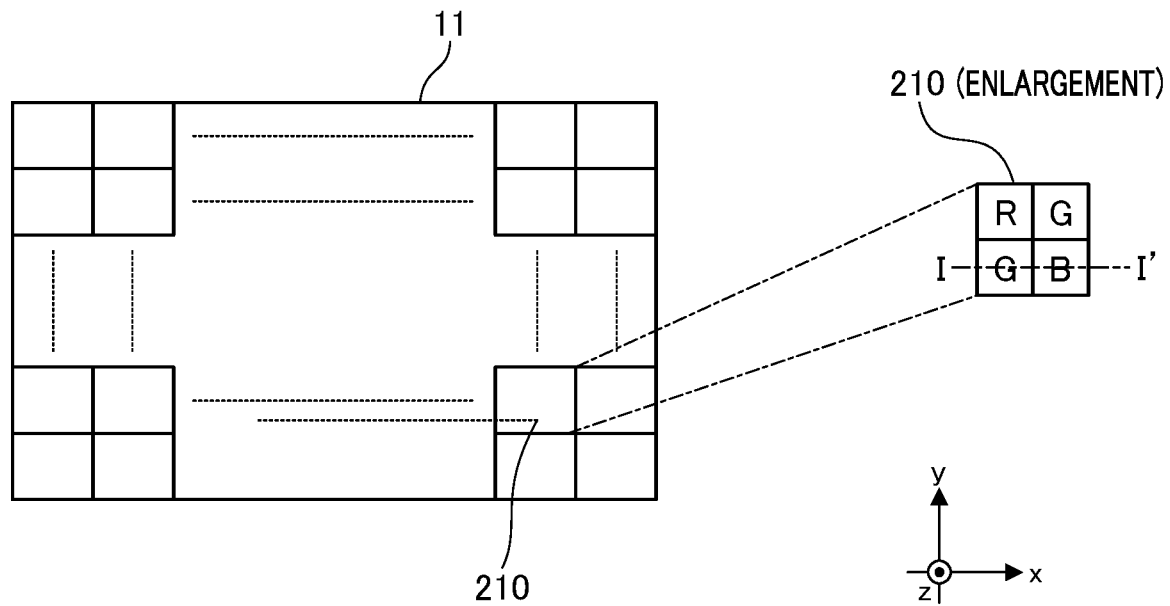
FIG. 5A is a view showing an arrangement of a color filter of an image pickup element 11 of the first embodiment.

As shown in FIG. 5A, the image pickup element 11 is configured by connecting and arranging a plurality of 2 rows×2 columns of pixel groups 210 in which different color filters are disposed. As shown in the enlarged view, red (R), green (G), and blue (B) color filters are disposed in the pixel group 210, and an image signal indicating any of R, G, and B color information is output from each pixel (photoelectric conversion element). However, a color filter array pattern is not limited thereto.

Figure 5B:
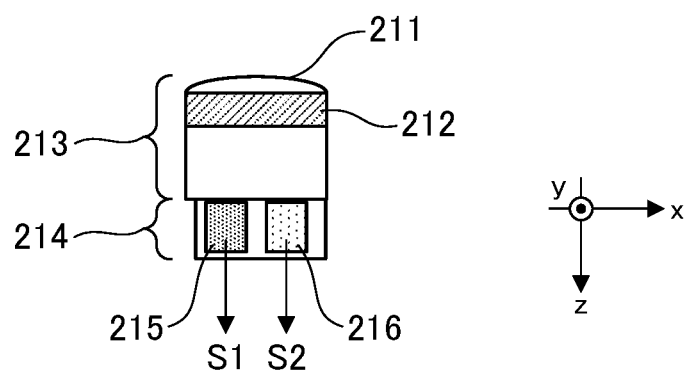
FIG. 5B is a schematic view of a cross-sectional structure of one pixel.

FIG. 5B is a schematic view of a cross-sectional structure of one pixel, and in one pixel (photoelectric conversion element), a plurality of photoelectric conversion units 215 and 216 are disposed side by side in a horizontal I-F cross section of FIG. 5A in order to perform distance measurement by an image pickup surface phase difference distance measurement method. That is, as shown in FIG. 5B, each of the pixels is composed of a light guide layer 213 including a microlens 211 and a color filter 212, and a light receiving layer 214 including a first photoelectric conversion unit 215 and a second photoelectric conversion unit 216.

In the light guide layer 213, the microlens 211 is configured to guide a luminous flux incident on the pixel to the first photoelectric conversion unit 215 and the second photoelectric conversion unit 216. Thus, the photoelectric conversion unit 215 and the second photoelectric conversion unit 216 receive light of an image via a different exit pupil region displaced in a predetermined direction. Further, the color filter 212 allows light in a predetermined wavelength band to pass therethrough, passes only light in any of the wavelength bands R, G. and B described above and guides the light to the first photoelectric conversion unit 215 and the second photoelectric conversion unit 216 in the subsequent stage.

The first photoelectric conversion unit 215 and the second photoelectric conversion unit 216 convert the received light into an analog signal, and two types of signals output from the two photoelectric conversion units are used for the distance measurement. That is, each of the pixels of the image pickup element 11 has the two photoelectric conversion units arranged in the horizontal direction. The distance measurement is performed based on a correlation distance between a first image signal S1 (an A image signal) composed of signals output from a group of first photoelectric conversion units 215 among the all pixels and a second image signal S2 (a B image signal) composed of signals output from a group of the second photoelectric conversion unit 216.

That is, each of the first photoelectric conversion unit 215 and the second photoelectric conversion unit 216 receives part of light having different luminous flux which is incident on the pixel via the microlens 211. Therefore, the two types of image signals S1 and S2 finally obtained become pupil-divided images with respect to the luminous fluxes passing through different regions of the exit pupil of the image pickup optical system 10. A signal obtained by synthesizing the image signals photoelectrically converted by the first photoelectric conversion unit 215 and the second photoelectric conversion unit 216 in each of the pixels can be used as an image signal for display.

Due to having such a structure, the image pickup element 11 of this embodiment can not only obtain an image signal for display but also output distance measurement image signals (the A image signal and the B image signal) separately. Here, the image pickup element 11 functions as an image information acquisition unit which reads and acquires an image (the A image signal and the B image signal) captured by the image pickup optical system having the anti-vibration optical system from the image pickup element for a predetermined exposure period. The image information acquisition unit is not limited to the image pickup element and includes, for example, a unit which temporarily records an image (for example, the A image signal and the B image signal) captured by the image pickup apparatus on a recording medium and then reads and acquires the image from the recording medium.

In this embodiment, the example in which all the pixels of the image pickup element 11 includes two photoelectric conversion units has been described, but the implementation of this embodiment is not limited thereto. For example, the structure shown in FIG. 5B may be disposed not only in the horizontal direction but also in the vertical direction. That is, a pixel configuration in which each of the pixels includes four photoelectric conversion units and not only horizontal pupil division but also vertical pupil division are possible may be used. With the four-division configuration, it is possible to perform high precision distance measurement even for a subject having a striped pattern in the horizontal direction or the vertical direction, for example.

<Distance Measurement Principle of Image Pickup Surface Phase Difference Distance Measurement Method>

FIG. 6 is a view for describing a distance measurement principle of the image pickup surface phase difference distance measurement method of the first embodiment, and a principle of deriving a subject distance based on the above-described pupil-divided image group (the A image signal and the B image signal) will be described with reference to FIG. 6.

Figure 6A:
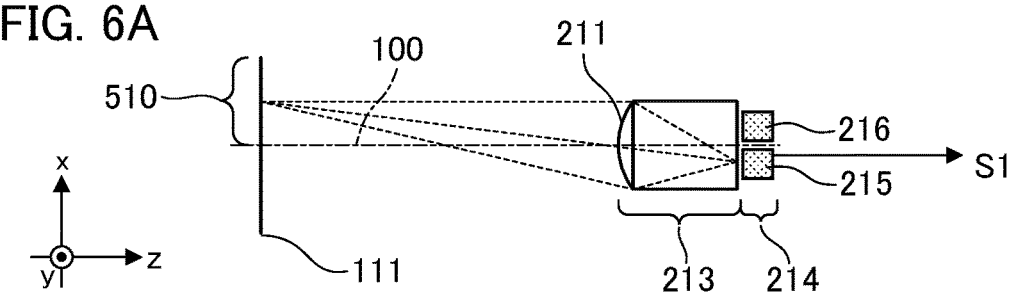
FIG. 6A is a schematic view showing the luminous flux received by an exit pupil 111 of an image pickup optical system 10 and a first photoelectric conversion unit 215 of one pixel in the image pickup element 11 of the first embodiment.
Figure 6B:
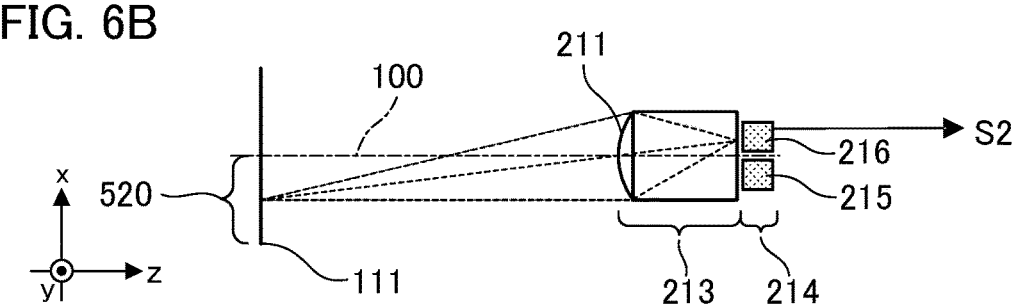
FIG. 6B is a schematic view showing the luminous flux received by a second photoelectric conversion unit 216.

FIG. 6A is a schematic view showing the exit pupil 111 of the image pickup optical system 10 and the luminous flux received by the first photoelectric conversion unit 215 of one pixel in the image pickup element 11. FIG. 6B is a schematic view showing the luminous flux received by the second photoelectric conversion unit 216 in the same manner.

The microlens 211 shown in FIGS. 6A and 6B is disposed so that the exit pupil 111 and the light receiving layer 214 are optically in a conjugate relationship. The luminous flux which has passed through the exit pupil 111 of the image pickup optical system 10 is focused by the microlens 211 and is guided to the first photoelectric conversion unit 215 or the second photoelectric conversion unit 216. At this time, as shown in FIGS. 6A and 6B, the first photoelectric conversion unit 215 and the second photoelectric conversion unit 216 mainly receive the luminous flux which has passed through different pupil regions displaced in the horizontal direction, for example. That is, a luminous flux which has passed through a first pupil region 510 is incident on the first photoelectric conversion unit 215, and a luminous flux which has passed through a second pupil region 520 is incident on the second photoelectric conversion unit 216.

The plurality of first photoelectric conversion units 215 included in the image pickup element 11 mainly receive the luminous flux which has passed through the first pupil region 510 and output the first image signal S1 (the A image signal). At the same time, the plurality of second photoelectric conversion units 216 included in the image pickup element 11 mainly receive the luminous flux which has passed through the second pupil region 520 and output the second image signal S2 (the B image signal). It is possible to obtain an intensity distribution of an image formed on the image pickup element 11 by the luminous flux which has passed through the first pupil region 510 from the first image signal S1. Further, it is possible to obtain an intensity distribution of an image formed on the image pickup element 11 by the luminous flux which has passed through the second pupil region 520 from the second image signal S2.

Figure 6C:
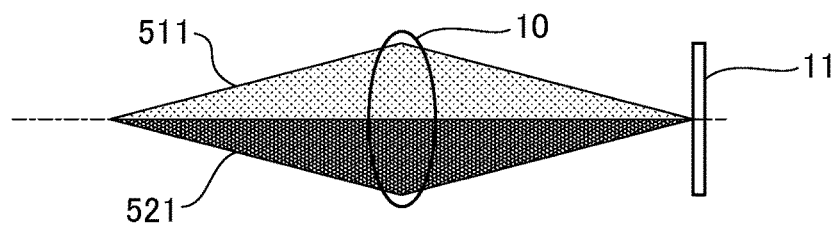
FIG. 6C is a view showing a state at the time of focusing.
Figure 6D:
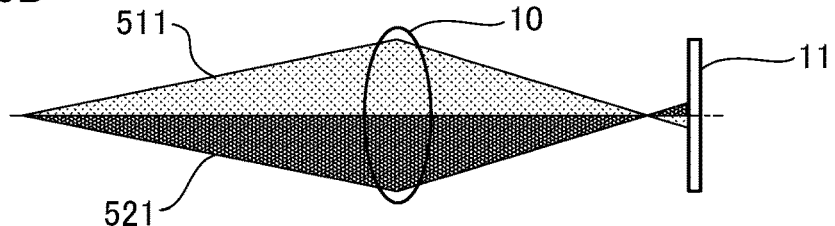
FIG. 6D is a view showing a state of defocusing in a negative direction of a z axis on the image side.
Figure 6E:
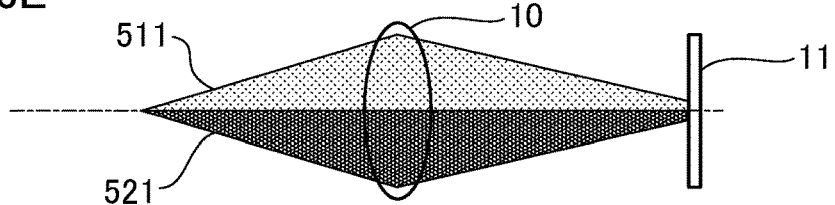
FIG. 6E is a view showing a state of defocusing in a positive direction of the z axis on the image side.

A relative displacement amount (so-called parallax amount or phase difference) between the first image signal S1 and the second image signal S2 is a value corresponding to the defocus amount. The relationship between the parallax amount and the defocus amount will be described with reference to FIGS. 6C, 6D, and 6E. FIGS. 6C, 6D, and 6E are schematic views describing the image pickup element 11 and the image pickup optical system 10. A reference numeral 511 in the drawing indicates a first luminous flux passing through the first pupil region 510, and a reference numeral 521 indicates a second luminous flux passing through the second pupil region 520.

FIG. 6C shows a state at the time of focusing, and the first luminous flux 511 and the second luminous flux 521 are converged on the image pickup element 11. At this time, the parallax amount between the first image signal S1 formed by the first luminous flux 511 and the second image signal S2 formed by the second luminous flux 521 becomes zero. FIG. 6D shows a state in which the image side is defocused in a negative direction of a z-axis. At this time, the parallax amount between the first image signal S1 formed by the first luminous flux and the second image signal S2 formed by the second luminous flux does not become zero and has a negative value.

FIG. 6E shows a state in which the image side is defocused in a positive direction of the z-axis. At this time, the parallax amount between the first image signal S1 formed by the first luminous flux and the second image signal S2 formed by the second luminous flux has a positive value. From the comparison between FIGS. 6D and 6E, it can be seen that a direction of the displacement is changed according to the positive and negative of the defocus amount. Further, it can be seen that the displacement occurs corresponding to an image pickup relationship (a geometric relationship) of the image pickup optical system according to the defocus amount. The parallax amount, which is the displacement between the first image signal S1 and the second image signal S2, can be detected by a region-based matching method which will be described later.

<Defocus Image Generation Process>

The defocus generation unit 141 in the image processing unit 14 generates a defocus image from the obtained two types of image signals.

Figure 7:
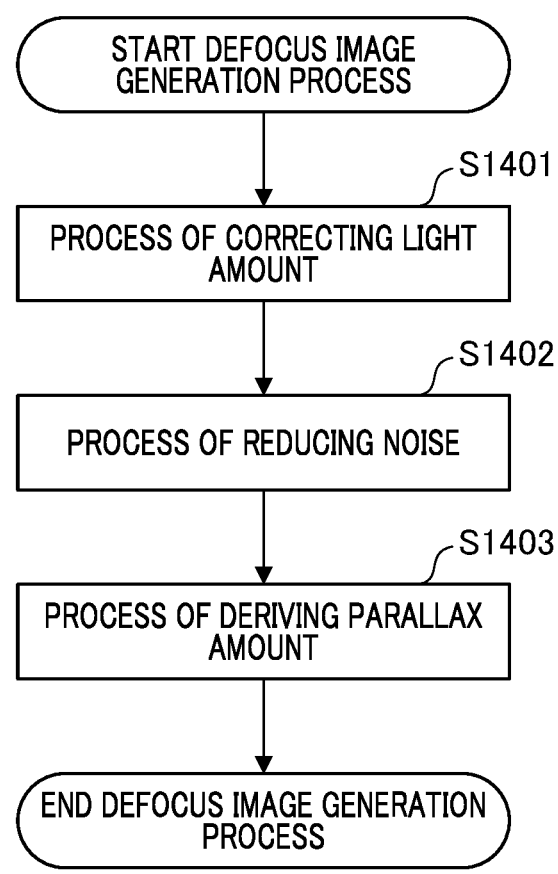
FIG. 7 is a flowchart showing a defocus image generation process performed by a defocus generation unit 141 of the first embodiment.

FIG. 7 is a flowchart showing a defocus image generation process performed by the defocus generation unit 141 of the first embodiment, and a process related to the defocus image generation will be described with reference to the flowchart of FIG. 7.

In Step S1401, the defocus generation unit 141 reads and acquires an image (the first image signal and the second image signal S2) imaged for a predetermined exposure period by the image pickup optical system having the anti-vibration optical system from the image pickup element. Then, a light amount correction process is performed on the first image signal and the second image signal S2. Due to vignetting at a peripheral angle of view of the image pickup optical system 10, shapes of the first pupil region 510 and the second pupil region 520 are different from each other, and thus a light amount balance is lost between the first image signal S1 and the second image signal S2. Therefore, in this Step, the defocus generation unit 141 performs the correction of the light amount of each of the first image signal S1 and the second image signal S2 using, for example, the light amount correction value stored in advance in the storage unit 15 as a memory.

In Step S1402, the defocus generation unit 141 performs a process of reducing noise generated during the conversion in the image pickup element 11. Specifically, the defocus generation unit 141 realizes a reduction in noise by applying a filter process to the first image signal S1 and the second image signal S2. In general, in a high frequency region having a high spatial frequency, an SN ratio becomes low, and a noise component becomes relatively large.

Therefore, the defocus generation unit 141 performs a process of applying a low-pass filter of which a pass rate decreases as the spatial frequency increases. In the light amount correction in Step S1401, the correction may not be completely performed due to a manufacturing error of the image pickup optical system 10 or the like, and thus in Step S1402, a bandpass filter which blocks a DC component and has a low pass rate of a high frequency component is preferably adopted.

In Step S1403, the defocus generation unit 141 derives a parallax amount between these images based on the first image signal S1 and the second image signal S2. Specifically, the defocus generation unit 141 sets a point of interest corresponding to representative pixel information and a collation region centered on the point of interest in the first image signal S1. The collation region is, for example, a rectangular region, such as a square region having a predetermined length on one side, centered on the point of interest. Next, the defocus generation unit 141 sets a reference point in the second image signal S2 and sets a reference region centered on the reference point.

The reference region has the same size and shape as the collation region described above. The defocus generation unit 141 derives a degree of correlation between the image included in the collation region of the first image signal S1 and the image included in the reference region of the second image signal S2 while sequentially moving the reference point. Then, the reference point having the highest degree of correlation is specified as a corresponding point corresponding to the point of interest in the second image signal S2. The amount of relative displacement between the corresponding point and the point of interest calculated in this way is the parallax amount at the point of interest.

The defocus generation unit 141 calculates the parallax amount while sequentially changing the point of interest according to the representative pixel information, thereby deriving the parallax amount at a plurality of pixel positions determined by the representative pixel information. In this embodiment, for simplification, in order to obtain defocus information at the same resolution as a display image, the number of pixel positions for calculating the parallax amount (the number of pixel groups included in the representative pixel information) is set to be the same as the number of pixels of the display image. A method such as normalized cross-correlation (NCC), sum of squared difference (SSD), sum of absolute difference (SAD) may be used as a method of deriving the degree of correlation.

Further, the derived parallax amount d can be converted into a defocus amount which is distance information regarding the distance from the image pickup element 11 to a focal point of the image pickup optical system 10 using a predetermined conversion coefficient. Here, the process of Step S1403 functions as a distance information acquisition step for acquiring the distance information regarding a distance to a subject based on the image.

Assuming that the predetermined conversion coefficient is K and the defocus amount is ΔL, The derived parallax amount d can be converted into the defocus amount by $$\Delta L = K \times d \qquad \text{Equation 3}$$

The defocus generation unit 141 configures two-dimensional information having the defocus amount for each of the pixels, which is derived in this way, as a pixel value and stores the two-dimensional information as a defocus image in a memory (not shown). That is, the distance information can be acquired as a two-dimensional distance map. The defocus image obtained in this way can be used for subject distance measurement or the like as a map of the defocus amount.

FIG. 8 is a flowchart showing a process related to the distance measurement according to the first embodiment, and a flow of the distance measurement by the first embodiment will be described with reference to FIG. 8.

Figure 8B:
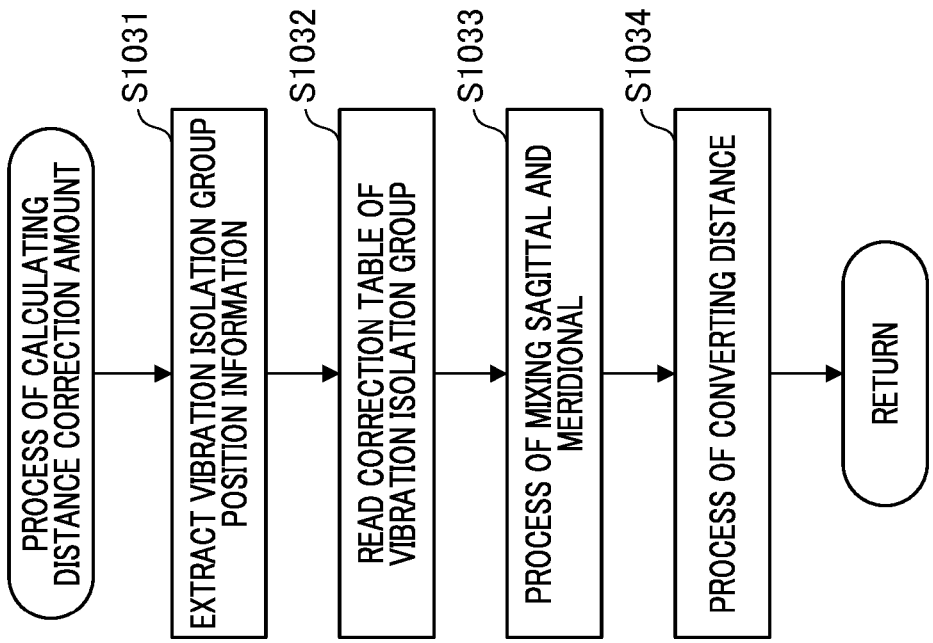
FIG. 8B is a flowchart showing a process of Step S103.
Figure 8A:
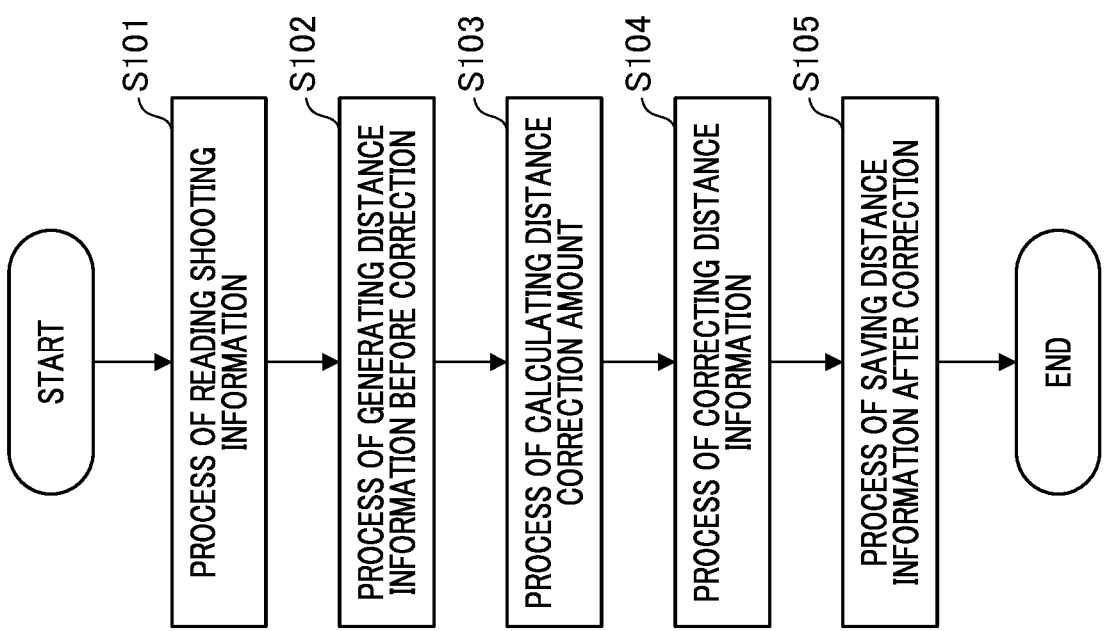
FIG. 8A is a flowchart of a distance measurement of the first embodiment.

FIG. 8A is a flowchart of the distance measurement of the first embodiment and is a process performed by the measurement unit 13 in FIG. 4.

In a shooting information reading process in Step S101, for example, a process of reading parameters such as a focal distance, a focal position, an aperture value, and a shooting magnification added to the image as metadata, and a process of reading the position information and the phase information of the anti-vibration group are performed. Each of the parameters is used when the subject distance is calculated from the defocus amount in post-processing and is stored in the storage region.

The position information and the phase information of the anti-vibration group are a driving amount and a driving direction of the anti-vibration optical system during a period in which the image is captured. That is, for example, an average value of each of the driving amount and the driving direction of the anti-vibration optical system in the exposure period (the image pickup period) of the image acquired for performing the distance measurement by the image pickup surface phase difference distance measurement method or the like are acquired. The same applies when the period of capturing the image is limited by a shutter or the like.

As described above, in this embodiment, the distance information is corrected based on the aberration information according to the driving amount of the anti-vibration optical system during the period of capturing the image for distance measurement.

In a distance information generation process before correction in Step S102, distance information including the fluctuation in the image surface curvature due to the anti-vibration group is generated. The defocus amount is calculated by the above-described image pickup surface phase difference distance measurement method or the like, and subject distance information before correction is calculated using the parameters obtained in Equations 1 and 2 and Step S101.

In Step S103, a distance correction amount calculation process is performed. The contents of the process of Step S103 are shown in the flowchart of FIG. 8B.

As shown in FIG. 8B, the position information of the anti-vibration group is extracted in Step S1031. Here, the position information is information on the driving amount and phase of the anti-vibration group, that is, an amount of distance from the optical axis and the driving direction, as shown in FIG. 3.

In Step S1032, data of a plurality of correction tables of the anti-vibration group is read from, for example, the storage unit 15. In this embodiment, the correction table is a table including data based on the aberration information according to the driving amount of the anti-vibration group and including data based on the aberration information according to at least one parameter such as a focal distance, a focal position, an aperture value, and a shooting magnification. Further, in this embodiment, the data in the correction table is data of the defocus amount corresponding to the image surface curvature (the aberration information) generated by the anti-vibration group.

Since an amount of data increases when each of the parameters is finely divided and the correction table is held, the fine correction table is calculated by roughly dividing each of the parameters, holding the correction table and performing a linear interpolation calculation between the parameters. The defocus amount may be expressed by a polynomial expression centered on the optical axis and with an image height direction as a variable. Further, the contents of the correction table stored in the memory are not limited to the defocus amount but may be data related to the aberration information or the like.

In this embodiment, the plurality of correction tables is provided in advance for each combination of parameters. That is, the memory has, for example, a correction table based on the aberration in a sagittal direction and a correction table based on the aberration in a meridional direction for each combination of parameters. Thus, the amount of data in the correction table can be reduced, a storage region for holding data can be prevented from becoming large, and the cost of the distance measurement apparatus can be curbed.

In Step S1033, a process of mixing the data of the plurality of correction tables extracted in Step S1032 is performed. For example, a process of mixing the data of the correction table in the sagittal direction and the data of the correction table in the meridional direction according to the parameters corresponding to the phase (the driving direction) of the anti-vibration group is performed.

Specifically, when an angle formed by the parallax detecting direction and the driving direction of the anti-vibration group is set to a drive phase θ as shown in FIG. 3, sagittal and meridional tables are multiplied by sin θ and cos θ, respectively, and then the data of the correction table is added to generate the corrected correction table. In this embodiment, the above-described methods are used to significantly suppress the amount of data, but when the memory capacity is sufficient, in addition to each of the above parameters, a plurality of tables corresponding to the phase (the driving direction) of the anti-vibration group may be stored.

In Step S1034, a process of converting the corrected correction table calculated in Step S1033 into a distance is performed. Due to this process, it is possible to calculate a distance correction amount for correcting the error due to the image surface curvature generated by the anti-vibration.

In Step S104, a process of correcting the distance information is performed. Due to adding the distance correction amount calculated in Step S103 to the subject distance information before correction calculated in Step S102, subject distance information after correction in which the image surface curvature component generated by the anti-vibration group is removed can be calculated. That is, in this embodiment, the subject distance information is corrected based on the aberration information according to the driving amount of the anti-vibration optical system and the driving direction of the anti-vibration optical system.

In Step S105, a process of saving the subject distance information after correction calculated in Step S104 in the storage region is performed.

As described above, according to this embodiment, it is possible to enable the distance measurement with high accuracy even when shooting is performed while the anti-vibration mechanism is operated.

Second Embodiment

Next, FIG. 9 is a flowchart showing a distance measurement process according to a second embodiment of the present invention, and a flow of a range measurement apparatus according to the second embodiment will be described with reference to FIG. 9.

FIG. 9A is a flowchart for distance measurement of the second embodiment which is performed by the measurement unit 13 in FIG. 4 in the same manner as the first embodiment.

In the flowchart in the second embodiment shown in FIG. 9, a flowchart of a contrast direction selection process is added to the first embodiment. Further, in the second embodiment, the pixel of the image pickup element includes four photoelectric conversion units, and a pixel configuration in which not only the pupil division in the horizontal direction but also the pupil division in the vertical direction are possible is used. With the 4-division configuration, it is possible to detect a subject not only in the horizontal direction but also in the vertical direction. That is, directions of the two exit pupil regions used for phase difference detection can be switched between the horizontal direction and the vertical direction.

Step S201 and Step S202 are the same processes as Steps S101 and S102 of the first embodiment.

In Step S203, a contrast direction is selected with reference to the image information. The contents of the process of Step S203 are shown in the flowchart of FIG. 9B.

As shown in FIG. 9B, the image is read in Step S2031. In Step S2032, it is determined from the image whether contribution of a horizontal contrast component is large or contribution of a vertical contrast component is large at the edge of the image. In Step S2033, any one of a horizontal distance measurement (a distance measurement in the horizontal direction) or a vertical distance measurement (a distance measurement in the vertical direction) is selected for each of the pixels. A map in which a distance measurement direction is selected is generated in Step S2034. That is, for example, the horizontal direction and the vertical direction can be switched as the distance measurement direction according to the contrast characteristics of the subject, and the aberration information for correcting the distance information is changed according to the switching between the horizontal direction and the vertical direction.

Figure 10:
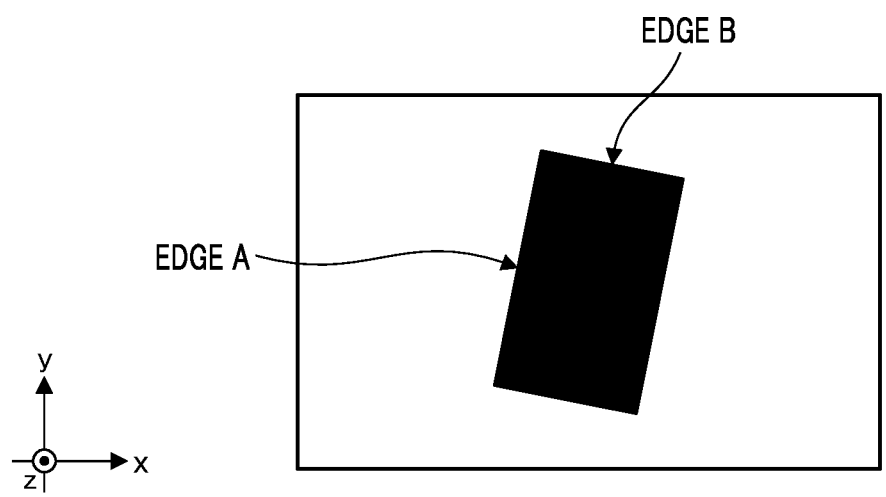
FIG. 10 is a view showing an example of an edge direction of the second embodiment of the present invention.

FIG. 10 is a view showing an example of an edge direction of the second embodiment. In the case of an image having edges A and B as shown in FIG. 10, since a vertical component is a main component of the edge A, the horizontal distance measurement is selected for the corresponding edge portion, and since a horizontal component is a main component of the edge B, the vertical distance measurement is selected, and a map in the distance measurement direction is generated and saved.

As in the first embodiment, for the pixels in the horizontal distance measurement, an angle formed by the horizontal direction and the driving direction of the anti-vibration group is set as a drive phase θ, and the sagittal and meridional tables are multiplied by sin θ and cos θ, respectively, and then the table is added to obtain a correction table. On the other hand, for the pixels in the vertical distance measurement, an angle formed by the vertical direction and the driving direction of the anti-vibration group is set as a phase φ, and the sagittal and meridional tables are multiplied by sin φ and cos φ, respectively, and then the table is added to obtain a correction table. As described above, in this embodiment, since the distance information is corrected based on the different aberration information according to the contrast characteristic of the subject in the image, the distance measurement can be performed with high accuracy.

In Step S203, the distance measurement direction may not be determined from the image but may be determined using a map in which the distance measurement direction is selected using information regarding the distance measurement direction held as the image information. For example, it is determined at the time of distance measurement whether the vertical distance measurement is performed or the horizontal distance measurement is performed for each of the pixels, and it is held as two-dimensional information. Since it is not necessary to sequentially calculate the contrast of the image by determining the vertical distance measurement or the horizontal distance measurement based on the two-dimensional information, the processing can be speeded up.

Steps S204 to S206 are the same processes as Steps S103 to S105 of the first embodiment. The contents of the process of Step S204 are shown in the flowchart of FIG. 9C. Since Steps S2041 to S2044 in the flowchart of FIG. 9C are the same as Steps S1031 to S1034 of FIG. 8B, the description thereof will be omitted.

According to the second embodiment, it is possible to enable the distance measurement with high accuracy even for a subject in an arbitrary contrast direction in the case of shooting in which the anti-vibration mechanism is effective.

Other Embodiments

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the range measurement apparatus and so on through a network or various storage media. Then, a computer (or a CPU, an MPU, or the like) of the range measurement apparatus and so on may be configured to read and execute the program. In such a case, the program and the storage medium storing the program configure the present invention.

This application claims the benefit of Japanese Patent Application No. 2021-007796 filed on Jan. 21, 2021, which is hereby incorporated by reference herein in its entirety.

What is claimed is:

1. A range measurement apparatus comprising:
    at least one processor or circuit configured to function as a plurality of units comprising:
    (1) an image information acquisition unit configured to acquire an image of a subject captured by an image pickup optical system, the image pickup optical system including an anti-vibration optical system and an image sensor;
    (2) a distance information acquisition unit configured to acquire distance information regarding a distance from the image sensor to the subject based on the image; and
    (3) a distance correction unit configured to correct the distance information based on aberration information according to a driving amount and a driving direction of the anti-vibration optical system,
    wherein the driving direction corresponds to an angle with respect to a detecting direction.

2. The range measurement apparatus according to claim 1, wherein the anti-vibration optical system performs anti-vibration by driving at least one optical element in a direction perpendicular to an optical axis or tilting the optical element with respect to the optical axis.

3. The range measurement apparatus according to claim 1, wherein the distance correction unit corrects the distance information based on the aberration information according to at least one of a focal distance, a focal position, an aperture value, and a shooting magnification of the image pickup optical system.

4. The range measurement apparatus according to claim 1, wherein the distance correction unit corrects the distance information based on the aberration information according to the driving amount of the anti-vibration optical system during a period of capturing the image.

5. The range measurement apparatus according to claim 1, wherein the distance correction unit includes a memory which stores at least one correction table based on the aberration information according to the driving amount of the anti-vibration optical system.

6. The range measurement apparatus according to claim 1, wherein the distance correction unit corrects the distance information based on the aberration information according to the driving amount of the anti-vibration optical system and a driving direction of the anti-vibration optical system.

7. The range measurement apparatus according to claim 5, wherein the correction table includes a correction table based on the aberration information in a sagittal direction and a correction table based on the aberration information in a meridional direction.

8. The range measurement apparatus according to claim 7, wherein the distance correction unit corrects the distance information using data obtained by mixing data of the correction table in the sagittal direction and data of the correction table in the meridional direction.

9. The range measurement apparatus according to claim 1, wherein the distance correction unit corrects the distance information based on different aberration information according to the subject.

10. The range measurement apparatus according to claim 1, wherein the distance information acquisition unit acquires the distance information by calculating a phase difference of the image via two exit pupil regions displaced in a predetermined direction.

11. The range measurement apparatus according to claim 10, wherein the distance information acquisition unit is able to switch between a horizontal direction and a vertical direction as the predetermined direction.

12. The range measurement apparatus according to claim 11, wherein, when the distance information acquisition unit switches the predetermined direction, the distance correction unit changes the aberration information for correcting the distance information.

13. The range measurement apparatus according to claim 11, wherein the distance information acquisition unit switches between the horizontal direction and the vertical direction as the predetermined direction according to the subject.

14. The range measurement apparatus according to claim 1, wherein the distance information acquisition unit acquires the distance information as a two-dimensional distance map.

15. The range measurement apparatus according to claim 1, wherein the image information acquisition unit includes an image pickup unit which captures an image of the subject.

16. A non-transitory computer-readable storage medium configured to store a computer program for a range measurement apparatus to execute a method comprising the following steps:
   an image information acquisition step of acquiring an image of a subject captured by an image pickup optical system, the image pickup optical system including an anti-vibration optical system and an image sensor;
   a distance information acquisition step of acquiring distance information regarding a distance from the image sensor to the subject based on the image; and
   a distance correction step of correcting the distance information based on aberration information according to a driving amount and a driving direction of the anti-vibration optical system,
   wherein the driving direction corresponds to an angle with respect to a detecting direction.

17. A range measurement method comprising:
   an image information acquisition step of acquiring an image of a subject captured by an image pickup optical system, the image pickup optical system including an anti-vibration optical system and an image sensor;
   a distance information acquisition step of acquiring distance information regarding a distance from the image sensor to the subject based on the image; and
   a distance correction step of correcting the distance information based on aberration information according to a driving amount and a driving direction of the anti-vibration optical system,
   wherein the driving direction corresponds to an angle with respect to a detecting direction.

* * * * *